Figure 1:
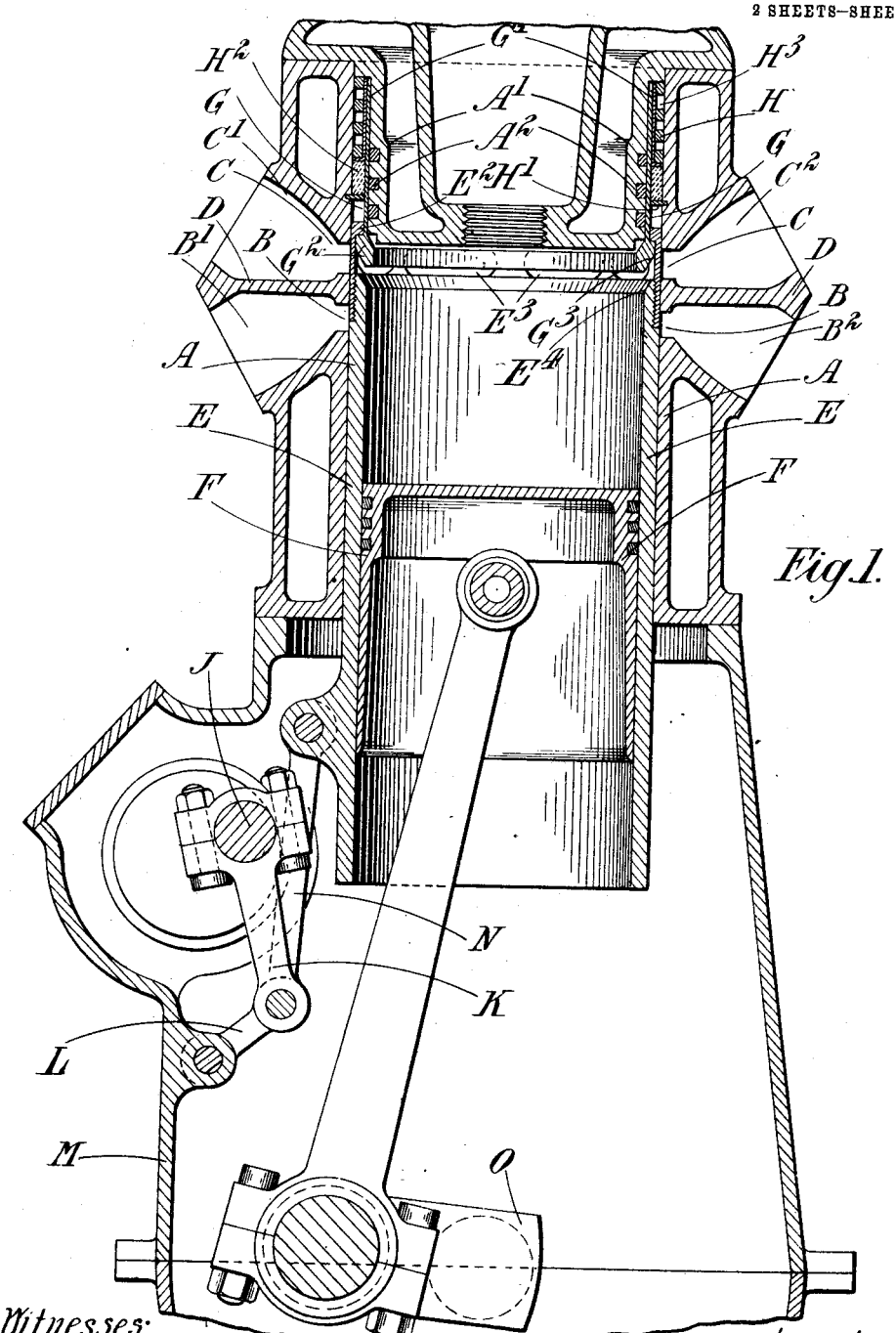

C. B. REDRUP.
VALVE AND VALVE GEAR OF INTERNAL COMBUSTION ENGINES.
APPLICATION FILED AUG. 26, 1913.

1,121,131.

Patented Dec. 15, 1914.

2 SHEETS—SHEET 1.

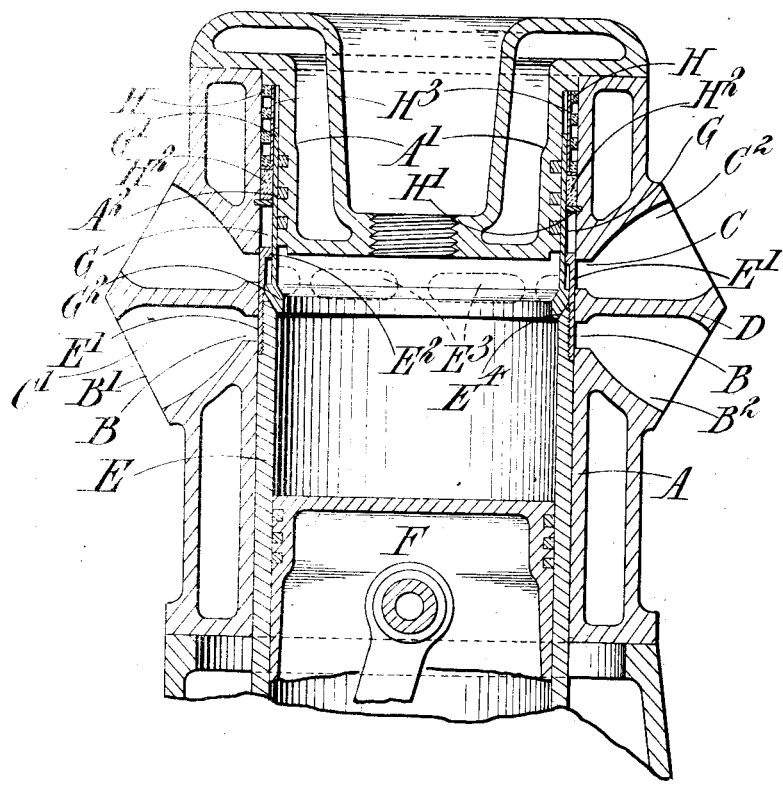

UNITED STATES PATENT OFFICE.

CHARLES BENJAMIN REDRUP, OF CHAPELTOWN, LEEDS, ENGLAND.

VALVE AND VALVE-GEAR OF INTERNAL-COMBUSTION ENGINES.

1,121,131.  Specification of Letters Patent.  Patented Dec. 15, 1914.

Application filed August 26, 1913. Serial No. 786,670.

*To all whom it may concern:*

Be it known that I, CHARLES BENJAMIN REDRUP, a subject to the King of England, residing at 16 Methley Drive, Chapeltown, Leeds, in the county of York, England, have invented certain new and useful Improvements in Valves and Valve-Gear of Internal-Combustion Engines, of which the following is a specification.

This invention is for improvements in or relating to the valves and valve gear of internal combustion engines of the type wherein a sleeve-valve is employed concentric with the cylinder and surrounding the engine piston, and has for its object to provide a simple and efficient form of valve and valve mechanism.

In sleeve-valve engines where two concentric sleeves are employed, or two half sleeves, mechanism is required for operating each sleeve or half sleeve independently, while if on the other hand only one sleeve is used, the mechanism for operating it is necessarily of a complicated nature in order that such movement may be imparted to it as is necessary for the proper opening and closing of the ports.

Another disadvantage in sleeve-valve engines as at present constructed is that it is found to be practically impossible to grind the valves so that they will accurately fit one another or the cylinder walls in contact with which they have to slide, and consequently considerable leakage takes place.

According to one feature of the present invention there is provided a main sleeve-valve concentric with the cylinder and surrounding the engine piston in combination with a supplementary concentric sleeve positively reciprocated by the main sleeve through a lost-motion connection. By adopting this arrangement the mechanism for operating the main sleeve-valve can be simple in construction, while no second set of mechanism is required to operate the supplementary sleeve. It is to be understood that the invention only relates to sleeve-valves and valve gear wherein the sleeve-valve is concentric with the engine cylinder and surrounds the engine piston; piston valves exterior to the engine cylinder and not surrounding the engine piston have been suggested with supplementary sleeves arranged with a lost-motion connection to the main valves and operated frictionally or partially by special springs, but these arrangements must not be confused with the valves and valve gear according to the present invention.

Conveniently one sleeve only is ported at a point which is uncovered by the other sleeve through lost-motion taking place between the sleeves in one direction. According to another feature of the invention the lost-motion between the main sleeve and the supplementary sleeve is secured by interengaging flanges and recesses on the sleeves in such manner that the end of the main sleeve engages and makes a close joint with part of the supplementary sleeve while driving the latter in one direction.

Other features of the invention will be pointed out hereinafter, and for a more complete understanding of the invention reference is directed to the accompanying drawings in which one form of engine is illustrated. It is to be understood, however, that this illustration is given merely by way of example.

In these drawings—Figure 1 is a longitudinal section of the engine, and Fig. 2 is a corresponding view of part of the mechanism showing the valves in different positions from that occupied in Fig. 1.

Like letters of reference refer to like parts throughout the drawings.

The cylinder A of the engine, the walls of which in this construction are water-cooled, is provided in the well-known manner with an inwardly-projecting cylinder-head A′ which is also water-cooled.

The inlet ports B and the exhaust ports C in the cylinder, which are situated toward one end thereof (preferably the cylinder-head end) may take the form of complete rings so as to give a large port area. In the construction shown provision is made for the mixture to be supplied at two places B′ and B² and for the exhaust to be collected at two places C′ and C² although this arrangement is not essential. The dividing web D between the inlet and exhaust passages is preferably cast in the cylinder casing.

Mounted concentrically with the cylinder to slide therein is a main sleeve E in the interior of which a piston F reciprocates. At the end of the main sleeve E, adjacent the inlet and exhaust ports in the cylinder, there is provided a supplementary sleeve G which is operated by the main sleeve E through a lost-motion connection. This supplementary sleeve, which [...]
light as possible and may conve[niently be]
of steel, while the main sleeve [...]
veniently be of iron, has a [...]
sion G' which is guided betwe[en ...]
said cylinder head A' and the [...]
Packing rings A² may conven[iently be set]
in the cylinder head A' to pre[vent leakage]
between the sleeve G and the [cylinder head]
A' while between the sleeve G [and the cyl-]
inder wall there may convenie[ntly be pro-]
vided a spring-loaded packing. [...]
this spring-loaded packing co[mprises a]
coiled spring H held in place b[...]
and a washer H' sprung into a [...] the
bore of the cylinder, the spa[ce ...]
spring H and the washer H' be[ing ...]
with a soft packing H². Thus an[y ...] of
leakage around the sleeve G [is ...]
since when the ports are closed [...]
very long path to be traversed b[efore the]
gases can escape, and this path [can be]
efficiently packed.

The lost-motion connection [between the]
sleeves E and G consists in th[e ...]
[...] of an extension E² on [...]
end of the main sleeve. [...]
has a shoulder E² which e[ngages a corre-]
sponding shoulder G², on the [...]
tary sleeve G, to pull the latter d[own when the]
main sleeve moves down. The [...]
is ported as shown at E³ to [give com-]
munication between the inter[ior and ex-]
terior of the cylinder. The [...]
sleeve E is preferably champf[ered at its lower]
orange and fit a correspondin[g ...]
fit of G² on the supplementar[y sleeve.]

The amount of lost motion [between the]
two sleeves is governed by the d[istance]
between the shoulder G² and [the end of the]
main sleeve and the arrangement is [such]
that the end of the main sleeve ene[...]
makes a close joint with the end of th[e sup-]
plementary sleeve while driving the l[atter]
in one direction i. e. upwardly. Th[e shoulder]
E² in the main sleeve extension E² is [so]
arranged that while the main sleeve i[s]
driving the supplementary sleeve with [the]
chamfered ends in close contact, the p[orts]
will be closed by the supplementary sl[eeve.]
The upward movement therefore of th[e]
main sleeve, in taking up the lost-motio[n]
will cause the ports E³ in the expansion [of it]
to be closed.

The ends of the main sleeve and the sup-
plementary sleeve need not necessarily be
chamfered but may be left square, in either
case they can readily be ground to such accu-
racy so that a close joint between the two
sleeves should always be obtainable. To as-
sist in maintaining this close joint, the con-
nection between the two sleeves may be such
that the supplementary sleeve is free to ro-
tate relatively to the main sleeve. This will
prevent excessive wear on any one part of

[...]ting [...]
[...] close joint between the two sleeves
[...] supplementary sleeve may be provided
[...] and flange which has one side
[...] the pressure of the gases in the
[...] and is produced therefrom on the
[...] other the ends of the two sleeves
[...] each other or a corresponding
[...] on the inner sleeve or by the inner
[...] of the main sleeve. The pressure in
the cylinder can thus act to tend to keep the
two sleeves in contact with each other.

Any suitable mechanism may be employed
for driving the main sleeve E. A conven-
ient one is illustrated in the drawings but
[...] construction and no claim is made
[...] this [...] mechanism per se. The
[...] in question comprises a crank-
[...] bearings and of a connecting-
[...] one end of which is pivoted to an
[...] on the crank case M at any
[...] M' of connection
[...] rod K and the arm
[...] end of a link N
[...] is pivoted to the
[...] motion given to
[...] same as that which
[...] operated directly by
the connecting rod K, but the motion is
[...] by the fact that the connecting rod
[...] and the link N are anchored by means
[...] to the crank case M. By
[...] suitable point for this anchorage
[...] proportions of the various mem-
[...] linkage the proper periods for
[...] closing the ports can be ob-
[...] crank pin J is preferably
[...] by the engine crank shaft O at half
speed of the latter.

The operation of the above described
[...] and valve mechanism as applied to a
four cycle engine may be as fol-
[...]. At the commencement of the inlet
[stroke] the main sleeve E will by means of
[...] extension E², have drawn down the
supplementary sleeve G until the exhaust
[ports] in the cylinder are nearly closed,
[and] the inlet ports [are] just about to be
opened. During the inlet stroke of the pis-
ton the main sleeve E will carry down the
supplementary sleeve G until the ports E³
in the main sleeve register with the inlet
ports E in the cylinder wall completely,
thus allowing the charge to be drawn into
the cylinder. During this stroke of the pis-
ton the supplementary sleeve G completely
closes the exhaust ports in the cylinder,
and at or just about the end of the inlet
stroke both inlet and exhaust ports in the
cylinder are closed. During the latter part
of the inlet stroke of the piston and also dur-
ing the compression stroke of the piston the
main sleeve is moving upwardly, but, owing
to the lost-motion connection between the
two sleeves it does not immediately drive the supplementary sleeves up, so that the inlet and exhaust ports in the cylinder still remain closed. When the lost-motion has been taken up the end of the main sleeve comes into engagement with the flange G² on the supplementary sleeve and then the upward movement of the latter is commenced. This position of the sleeves is shown in Fig. 2. The upward movement of both sleeves continues then nearly to the end of the power stroke of the piston so that this upward movement of the sleeves takes place during the periods in which the greatest pressure exists in the cylinder. The ends of the sleeves are therefore in close contact during this period so that with the aforesaid packing there is no danger of leakage taking place from the cylinder. Just before the end of the power stroke of the piston, i. e. just before the main sleeve commences its downward movement, this sleeve will be in such a position that its ports E³ completely register with the exhaust ports C in the cylinder. No leakage to exhaust can take place however because the supplementary sleeve is covering the ports E³. As, however, the main sleeve moves downwardly it will commence to open the ports E³ and thus will allow exhaust to commence, since by reason of the lost-motion connection between the two sleeves the downward movement of the supplementary sleeve does not commence immediately the downward movement of the main sleeve commences. During the exhaust or scavenging stroke of the piston the main sleeve takes up the lost-motion between the two sleeves and commences to bring down the supplementary sleeve, this being the position of the parts shown in Fig. 1. By the end of the exhaust stroke the supplementary sleeve has almost closed the exhaust port in the cylinder. The above described cycle of operations is then re-commenced.

An engine constructed and operating as described will give a high degree of compression and consequently a high degree of efficiency, while the simplicity of the valve gear necessary for the operation of the sleeves is an important factor in securing reliable working of the engine.

Various modifications may be made in the details of this invention without departing from the spirit thereof; for example the supplementary valve may have a ported extension which fits over the main sleeve in order to provide the lost-motion connection, or the extension from the supplementary sleeve may fit in the interior of the main sleeve instead of around the exterior thereof.

What I claim as my invention and desire to secure by Letters Patent is:—

1. In an internal combustion engine the combination of, a cylinder having circumferential inlet and exhaust ports displaced longitudinally of the cylinder from one another, a main sleeve concentrically disposed within the said cylinder and having a circumferential series of ports, means for reciprocating said main sleeve, a piston reciprocating within said main sleeve, a supplementary unported sleeve telescoped in an annular groove in the main sleeve and movable therein to cover and uncover said circumferential series of ports which are in the groove of the main sleeve, the groove being of such width as to allow of lost motion between said sleeves, substantially as described.

2. In an internal combustion engine the combination of, a cylinder having circumferential inlet and exhaust ports displaced longitudinally of the cylinder from one another, a main sleeve concentrically disposed within the said cylinder and having a circumferential series of ports, means for reciprocating said main sleeve, a piston reciprocating within said main sleeve, a supplementary unported sleeve telescoped in an annular groove in the main sleeve and movable therein to cover and uncover said circumferential series of ports, which are in the groove of the main sleeve, the groove being of such width as to allow of lost motion between said sleeves, the shoulder of said groove and said supplementary sleeve being so formed as to constitute a gas-tight joint when the sleeve is in position to cover the ports in the main sleeve, substantially as described.

3. In an internal combustion engine the combination of, a cylinder having circumferential inlet and exhaust ports displaced longitudinally of the cylinder from one another, a main sleeve reciprocating in said cylinder and having an internal conical seating formed on one end, a tubular extension on the same end thereof having a shoulder opposed to said conical seating and a circumferential series of ports between the shoulder and said conical seating, a supplementary sleeve entering said extension and having a conical seating thereon engaging said seating on the main sleeve, and a shoulder thereon engaging said shoulder on the tubular extension, said seating and said shoulder being so disposed relatively to their coöperating parts as to permit of lost motion between said main sleeve and said supplementary sleeve, substantially as described.

4. In an internal combustion engine the combination of, a cylinder having circumferential inlet and exhaust ports displaced longitudinally of the cylinder from one another, a main sleeve reciprocating in said cylinder and having an internal conical seating formed on one end, a tubular extension on the same end thereof having a shoulder opposed to said conical seating, and a circumferential series of ports between the shoulder and said conical seating, a supplementary sleeve entering said extension and having a conical seating thereon engaging said seating on the main sleeve and a shoulder thereon engaging said shoulder on the tubular extension, said seating and said shoulder being so disposed relatively to their coöperating parts as to permit of lost motion between said main sleeve and said supplementary sleeve and an internal flange on said supplementary sleeve exposed to the pressure of the gases in the cylinder on one side, and protected therefrom on the other side by said main sleeve, substantially as described.

5. In an internal combustion engine the combination of a frame, a cylinder having circumferential inlet and exhaust ports displaced longitudinally of the cylinder from one another, a main sleeve concentrically disposed within said cylinder, and having a circumferential series of ports, a piston reciprocating within said sleeve, a supplementary sleeve concentrically disposed within said main sleeve, means operatively connecting said main sleeve and said supplementary sleeve by a lost motion device, said supplementary sleeve being movable relatively to said main sleeve to cover said ports in said main sleeve, a crank-shaft operatively connected to said piston, a half-speed shaft driven therefrom, a crank on said half-speed shaft, a lever pivotally mounted on said frame, a connecting rod coupling said crank on the half-speed shaft to the end of said lever and reciprocating it, and a link connecting the end of said lever to said main sleeve to reciprocate it, substantially as described.

In testimony whereof I have signed my name to this specification in the presence of two subscribing witnesses.

CHARLES BENJAMIN REDRUP.

Witnesses:
  CHARLES E. TAYLER.
  A. R. BOYLE.